United States Patent [19]

Przybyla et al.

[11] 4,297,249

[45] Oct. 27, 1981

[54] METHOD OF TREATING SILVER OXIDE POWDER AND THE PRODUCT FORMED THEREFROM

[75] Inventors: Franciszek J. Przybyla, Mississauga; Eleanor J. Rossler, Lorne Park, both of Canada

[73] Assignee: Duracell International Inc., Bethel, Conn.

[21] Appl. No.: 957,597

[22] Filed: Nov. 3, 1978

[51] Int. Cl.³ .............................................. H01B 1/06
[52] U.S. Cl. ..................................... 252/518; 429/219; 423/604; 264/104
[58] Field of Search ........................ 252/518; 429/219; 423/604; 264/104

[56] References Cited

U.S. PATENT DOCUMENTS 3,057,944  10/1962  Ruetschi et al. ................. 429/219 X
4,096,328   6/1978  Kayama et al. ................. 429/219 X

*Primary Examiner*—Brooks H. Hunt
*Assistant Examiner*—J. L. Barr
*Attorney, Agent, or Firm*—Ronald S. Cornell; Israel Nissenbaum; Martin M. Glazer

[57] ABSTRACT

A silver oxide powder for use in the cathode of an alkaline silver oxide galvanic cell, being a mixture of at least 10% divalent silver oxide powder together with monovalent silver oxide powder, is produced by at least partially reducing the silver oxide powder mixture by reacting it with a fatty acid or a fatty acid salt and thereafter removing the reactant. The silver oxide powder displays a lower oxygen evolution rate when immersed in an alkaline electrolyte, and lower internal friction during powder flow under pressure when compared with a similar silver oxide mixture which is known not to have been so reacted.

13 Claims, 1 Drawing Figure

METHOD OF TREATING SILVER OXIDE POWDER AND THE PRODUCT FORMED THEREFROM

FIELD OF THE INVENTION

This invention relates to divalent silver oxide for use in electrochemical cells, and more particularly to a method for treating silver oxide powder and to cathodes compressed therefrom, for use in alkaline silver oxide galvanic cells, where the silver oxide powder mixture has had at least a minor amount of a fatty acid or a fatty acid salt reacted therewith. Alkaline silver oxide galavanic cells having improved stability are thereby provided.

BACKGROUND OF THE INVENTION

Alkaline divalent silver oxide cells have been known for a considerable period of time. However, a requirement for miniature, high energy capacity cells of the button cell variety—where there is a high power output and energy storage per unit volume—has recently arisen particularly in view of the wide acceptance of electrically powered watches and the like. There is a particular need for button cells having a high energy storage capacity and long shelf life, for such purposes as watches having a light emitting diode (LED) readout, LCD watches with backlights, electronic calculators, etc., where high energy pulses are demanded from the cell from time to time and where there is otherwise a low steady state current draw. In any event, either during its shelf life or its operating life, it is important that the cell demonstrate dimensional stability; and to do so, the rate of oxygen evolution within the cell must not be greater than the sum of the rates of oxygen diffusion to the anode of the cell of oxygen reaction with the anode, and oxygen escape from the cell.

Because of their high power output and energy storage per unit volume, divalent silver oxide cells are particularly attractive. However, divalent silver oxide is generally considered to be unstable in the presence of an aqueous electrolyte, such as any of the alkaline electrolytes generally used in commercial silver oxide cells. It has particularly been desirable to improve the stability of divalent silver oxide cells so as to take advantage of the characteristics stated above. One approach has been by Samuel Ruben in the U.S. Pat. No. 2,542,710 issued Feb. 20, 1951. In that patent, Ruben recognized that a steel or nickel substrate on the cathode can of a button cell tends to decrease the stability of the divalent silver oxide which is used in the cathode; and Ruben provided a silver plating or cladding on the cathode can to offset the tendency to decreased stability.

Dawson, in U.S. Pat. No. 3,484,294, issued Dec. 16, 1969, discloses a cell having a cathode which consists principally of divalent silver oxide over which a masking layer of monovalent silver oxide is placed, and above which a cellophane barrier is located between the monovalent silver oxide layer and an electrolyte absorbent layer. The Dawson cell, however, requires that the secondary active material layer—the monovalent silver oxide layer—be electrolyte impermeable; and it is difficult to produce such a cell in commercial quantities. In addition, the cell is subject to dimensional instability due to internal gassing—i.e., oxygen evolution—at greater rates than the recombinant and/or out-gassing rates.

Davies, in U.S. Pat. No. 3,853,262 issued Dec. 10, 1974, discloses a gold additive which is incorporated in the cathode or the cathode compartment of a divalent silver oxide cell. The gold additive is said to improve the stability of the cell, but has the disadvantage of increasing the cost of the cell.

Tvarusko, in U.S. Pat. No. 3,650,832, issued Mar. 21, 1972, proposes the addition of mercury, selenium and tellurium to a divalent silver oxide cell cathode, to improve the stability and/or the electrical conductivity thereof. The method of incorporating the additives is by physical admixture or by chemical coprecipitation, during the preparation of the divalent silver oxide.

Ruetschi et al, in U.S. Pat. No. 3,057,944, issued Oct. 9, 1962, teach a silver oxide cathode in a primary or secondary system where a surface active heteropolar substance is admixed either to the electrolyte or the silver cathode in an amount ranging from about 0.001 gram to about 0.2 gram per gram of silver; whereby there may be formed a polar chemical group which can attach itself to the surface of the silver oxide particles of the cathode, with the remainder of the molecule being hydrophobic in nature so as to hinder contact with the electrolyte. Excessive gassing of the divalent silver oxide when wetted by an alkaline electrolyte is reduced.

In all of the above prior art cells, as in the present invention, the anode or negative electrode is generally comprised of an amalgamated zinc powder; and the alkaline electrolyte is an aqueous solution of potassium hydroxide, sodium hydroxide, or a mixture thereof. Additional additives may also be included in the anode or electrolyte.

It has been noted that certain of the prior art divalent silver oxide cells have been particularly subject to dimensional instability due to excessive gassing of the divalent silver oxide cathode material. During storage or operation of such a cell, there is some spontaneous reduction of the divalent silver oxide to monovalent silver oxide, and at the same time there is a production of gaseous oxygen. A button cell can stay dimensionally stable, provided that the rate of oxygen evolution is not greater than the sum of the rates of oxygen diffusion to the anode of the cell or oxygen reaction with the anode, and oxygen escape or outgassing from the cell. Such increased internal gas pressure may cause physical separation of internal components within the cell, thereby permitting a particulate transfer of active material within the cell and thereby increasing the risk of an internal short circuit; or, in any event, there may be caused a bulging of the cell container to a greater extent than can be accommodated in its working position such as within an electroniccally operating watch case.

It has been found that the dimensional stability of divalent silver oxide cells, where the principal cathode material is divalent silver oxide or mixtures of divalent silver oxide with monovalent silver oxide, may be greatly enhanced, in keeping with the commercial requirements therefor and in accordance with this invention, by the reaction of silver oxide powder mixture which comprises at least 10% divalent silver oxide, the remainder including at least a minor amount of monovalent silver oxide, with at least a minor amount of a reagent which is a fatty acid, a salt of a fatty acid where the fatty acid has a chain length of at least twelve carbon atoms followed by removal of the fatty acid. In so doing, it has been found that a silver oxide powder mixture which has been reacted with a fatty acid or a fatty acid salt, has a much lower rate of oxygen evolution when wetted by an alkaline electrolyte, and a lower internal friction during powder flow under pressure than a silver oxide powder mixture which is known not to have had at least a minor amount of a fatty acid or a fatty acid salt reacted therewith. In addition, a cathode pellet which has been compressed from a silver oxide powder mixture treated as disclosed herein also displays a lower rate of oxygen evolution when wetted by an aqueous alkaline electrolyte.

Thus, the present invention provides not only a silver oxide powder mixture for use in the cathode of an alkaline divalent silver oxide galvanic cell, but also a method of preparing and producing the cathode pellet, and a cell which includes the cathode pellet; all so as to exhibit greatly improved dimensional stability characteristics with respect to prior art cells, or with respect to similar cells having cathodes prepared from similar silver oxide powder mixtures which are known not to have been reacted with at least a minor amount of a reagent which is a fatty acid or a fatty acid salt where the fatty acid has a chain length of at least twelve carbon atoms.

BRIEF SUMMARY OF THE INVENTION

It is a principal object of this invention to provide an alkaline divalent silver oxide galvanic cell having greatly improved dimensional stability properties over the prior art cells.

A further object of this invention is to provide a silver oxide powder mixture, and a cathode pellet compressed therefrom, for silver oxide cells, and a method of producing the same.

A still further object of this invention is to provide a divalent silver oxide cell which does not have excessive rates of internal oxygen evolution, and within which internal reoxidation or reduction of the active materials may be accommodated, thereby improving the shelf life and operating life of the cell.

Yet another object of this invention is to provide a method whereby cathode pellets of silver oxide powder mixture having divalent silver oxide and monovalent silver oxide constituents may be easily, efficiently and economically produced.

BRIEF DESCRIPTION OF THE DRAWINGS

These and other features and objections of the invention are more specifically discussed hereafter, in association with the accompanying drawing which shows a typical cross-section of a simple button cell made in accordance with this invention, for purposes of discussion thereof.

DESCRIPTION OF THE PREFERRED EMBODIMENTS

Figure 1:
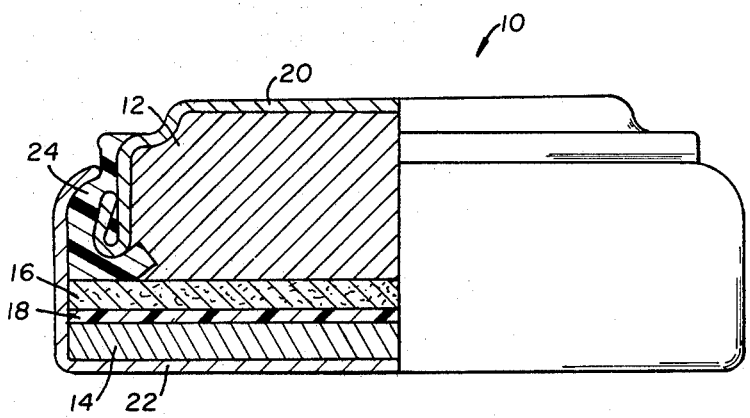

In general, with reference to the single FIGURE of drawings, the discussion hereafter relates to a button cell 10 which comprises an anode 12 and a cathode 14. For the sake of discussion, and in keeping with general assembly found in commercial embodiments of button cells, there is shown a pair of layers between the anode 12 and the cathode 14. Those layers more particularly constitute an electrolyte absorbent separator 16 and a barrier layer 18, although the barrier layer 18 may be eliminated or there may be more than one absorbent separator. Other specific features may be included in any particular button cell. The anode, separators and cathode are retained in a container which includes an anode cap 20 and cathode can 22, so that they are electrically insulated one from the other and also to assist positively in mechanically sealing the cell. The upper edge of the cathode can 22 is crimped in a special tool designed for that purpose, so as to secure a grommet 24 in place against the upper edge of the cathode can and the lower edge of the anode cap; and the anode cap 20 and cathode can 22 function as the negative and positive terminals, respectively, for the cell.

In general, the anode 12 comprises a lightly compacted amalgamated zinc powder, to which has been added up to 10% by weight of mercury and up to 3% by weight of carboxymethylcellulose or other gelling agent. The electrolyte carrying separator (or separators) may comprise a cellulosic or porous polymer material. The electrolyte is generally an aqueous solution of sodium hydroxide, potassium hydroxide, or a mixture of both. In addition, there may be up to 8% zinc oxide dissolved in the electrolyte.

It is known, that silver ions can penetrate the absorbent, electrolyte carrying separator layer 16, so that the barrier layer 18 must be disposed against the cathode 14 so as to preclude or retard ionic flow from the cathode 14 towards the anode 12, at least of the soluble silver species present within the cathode compartment of the cell 10. The barrier layer 18 may be of any suitable material such as cellophane, polyethylene, polypropylene, polycarbonate, polyvinylchloride and combined layers thereof. A preferred barrier comprises a layer of radiation-grafted polyethylene and at least one continuous layer of cellophane.

As noted above, this invention provides a silver oxide powder mixture which may be used to produce the cathode 14 of a galvanic cell. The cathode is such that it unexpectedly imparts to cells a greatly improved dimensional stability when compared to that of divalent silver oxide cells of the prior art; and the dimensional stability of the cells comes as a consequence of the nature of the cathode, whereby the silver oxide powder mixture from which it has been produced has been reacted with at least a minor amount of a reagent which is a fatty acid or a fatty acid salt; where the fatty acid has a chain length of at least twelve carbon atoms.

Referring now specifically to the cathode 14, it is a compressed pellet which is formed from a silver oxide powder mixture according to this invention. That powder mixture may be a commercially available divalent silver oxide powder, or it may be a mixture of divalent and monovalent silver oxides and in any event it has at least 10% divalent silver oxide constituent and includes at least a minor amount of monovalent silver oxide constituent. Other, compatible additives, such as graphite or tetrafluoroethylene powder, may also be present. Moreover, the silver oxide powder mixture has had at least a minor amount of a fatty acid or a fatty acid salt reacted therewith; with the excess thereafter having been removed and where the fatty acid has a chain length of at least twelve carbon atoms, desirable 12–20 carbon atoms. The quantity of fatty acid used as reagent can vary from about 1 percent to about 20 percent by weight of the silver oxide powder mixture and preferably it is from about 5 percent to about 10 percent.

The divalent silver oxide constituent may, therefore, be present in the amount of about 10–99% by weight, with the monovalent silver oxide constituent being present in an amount of from about 1 to 90% by weight. Where the powder mixture is so constituted, and a cathode pellet is compressed from it, as discussed hereafter, a divalent silver oxide cell having that cathode exhibits improved dimensional stability.

As to the powder mixture, it has been unexpectedly noted to exhibit certain characteristics when compared with a similar powder mixture which is known not to have been reacted with at least a minor amount of a fatty acid or a fatty acid salt, as required by the present invention. These characteristics are such that, if the powder is immersed in or wetted by an alkaline electrolyte, the reacted (treated) silver oxide powder mixture displays a lower rate of oxygen evolution. Further, the reacted powder mixture demonstrates a lower internal friction during powder flow under pressure, so that pellet pressing may be accomplished without adding an additional lubricant. In addition, a compressed pellet, when formed, may have a more consistent or uniform density throughout.

It is believed that a silver oxide powder mixture according to this invention, having been reacted with at least a minor amount of the fatty acid or fatty acid salt as referred to herein, is such that each particle of the silver oxide powder mixture exhibits a heterogeneous combination of divalent silver oxide and monovalent silver oxide, substantially in the same proportions as of the powder itself.

Preferably, the minor amount of a fatty acid or a fatty acid salt—where the fatty acid salt is an alkali metal salt (e.g. sodium or potassium) of a fatty acid—is, or is based on, $C_{12}$–$C_{20}$ fatty acids such as oleic, stearic, palmitic, lineoleic, lauric and myristic acids, and mixtures thereof; and generally the alkali metal salts of palmitic, oleic, and stearic acids are preferred.

There are several well known methods whereby a mixture of divalent silver oxide and monovalent silver oxide may be produced, or commercially available divalent silver oxide powder may be obtained; but the powder which is so produced or obtained normally exhibits high internal resistance to powder flow under pressure, and higher rates of oxygen evolution when immersed in or wetted by an aqueous alkaline electrolyte then silver oxide powder mixtures according to this invention.

In any event, a method of producing a silver oxide powder mixture according to this invention may include at least the steps of partially reducing a mixture having at least 10% divalent silver oxide powder, the remainder including at least a minor amount of monovalent silver oxide powder, by reacting the silver oxide powder mixture with a reagent which is a fatty acid or a fatty acid salt where the fatty acid has a chain length of at least twelve carbon atoms and thereafter removing the reagent from the reacted silver oxide powder mixture.

Generally, the step of removing the reagent from the reacted silver oxide powder mixture is accomplished by washing the reacted powder with water until no further trace of reagent is noted to be washed from the reacted mixture.

The above process may be controlled, in accordance with a preferred practice according to this invention, so that at least 1% of divalent silver oxide constituent present in the mixture is reduced to monovalent silver oxide.

Following washing and drying of the reacted silver oxide powder mixture, it is believed that not more than about 0.05% by weight of reagent remains in the silver oxide powder mixture. Nonetheless, unexpected improvements in dimensional stability characteristics of the cathode material have been consistently noted.

Accordingly, a cathode pellet having uniform density can be produced from a homogeneous silver oxide powder in keeping with this invention using standard pelleting and consolidating techniques and operations, even without the addition of any further lubricant.

Following the production of a homogeneous silver oxide powder mixture according to this invention, such as by the process discussed above, whereby the silver oxide powder mixture is reacted with at least a minor amount of a fatty acid or a fatty acid salt, an alkaline cell may be assembled having a compressed and pelleted anode and cathode, at least one electrolyte carrying separator disposed between them, where the combination is retained in a conductive retainer, all as discussed above with reference to the drawing. Thus, the cathode has at least 10% divalent silver oxide constituent and at least a minor amount of monovalent silver oxide constituent.

There may, in addition to the structure discussed above with reference to the general showing of a button cell in the FIGURE of drawings, be various modifications of the invention, such as the use of an interposed silver screen or layer above the cathode 14, either between the cathode 14 and the barrier layer 18, or between the barrier layer 18 and the separator 16. Such additional silver layer may be expanded metal, porous foil, or metallic silver deposited on the surface of the separator; or the interposed silver layer may be formed by short-circuiting or pre-discharging the cell so as to form a layer of metallic silver on the cathode 14. In any event, a silver layer may be formed on the surface of the cathode.

Several examples follow which illustrate the application of this invention and the advantages derived therefrom in respect of improved stability characteristics of button cells having cathodes produced from silver oxide powder mixtures in keeping with this invention.

COMPARATIVE EXAMPLE A

72 Grams of sodium hydroxide in pellet form was added to one liter of water, and the temperature of the solution was maintained at approximately 85° C. Thereafter, 75 grams of potassium persulfate was added to the hot alkaline solution. Following the above step, 51 grams of silver nitrate was dissolved in a minimum amount of water which was then mixed with the hot alkaline solution, with the temperature of the resulting mixture being permitted to rise to about 90° C. The product was stirred and maintained at about 90° C. for a period of approximately 15 minutes.

Thereafter, a precipitate of predominantly black divalent silver oxide powder was filtered, and the sulphate ions and other impurities were removed therefrom by washing the precipitate with de-ionized water which was made slightly alkaline by the addition of sodium hydroxide thereto. The resulting product was then dried (it could have been air dried, but was oven dried at a temperature of about 60° C.) to constant weight.

The silver oxide powder mixture which came from the above process could not be compressed into a cathode pellet of uniform density, without a lubricating additive. Suitable lubricants for such purposes are known in the art, and include fluorocarbon powders or liquids, graphite and other lubricants which are well known in the art of powder metallurgy.

It was noted that the rate of oxygen evolution from one gram of powder, immersed in a 30% potassium hydroxide solution containing also 2% zinc oxide, and kept at a temperature of 45° C., amounted to 150 micro liters per gram per day. Cathode pellets for standard MS76 size button cells were produced, having 0.75 grams of cathode powder with lubricant additive, in accordance with usual manufacturing procedures. A number of cells were made and tested, and underwent an average height increase of 0.015 inches of the cathode pellets during two weeks storage at 45° C. Two out of ten cells ruptured after two weeks storage at 45° C.

EXAMPLE 1

Following the procedure for preparation of the predominantly black divalent silver oxide powder mixture as discussed above in Comparative Example A, and after precipitation thereof, approximately 10% of palmitic acid was introduced into the reaction vessel. The solution temperature was maintained at about 90° C., and the palmitic acid was allowed to react for about 30 minutes. Filtering, washing and drying of the product was carried out as in Comparative Example A.

By chemical analysis of the resultant dried silver oxide powder mixture, that powder mixture was found to contain 70% divalent silver oxide and 30% monovalent silver oxide. It was noted that the dry powder, which had had palmitic acid reacted therewith could be easily compressed into a cathode pellet of uniform density without using any lubricating additive.

The rate of oxygen evolution from one gram of the silver oxide powder mixture, when immersed in a 30% potassium hydroxide solution containing also 2% zinc oxide, and kept at a temperature of 45° C., was 30 micro liters per gram per day.

A number of MS76 size button cells were prepared having cathode pellets which were compressed from the silver oxide powder mixture made in this example, and during two weeks of storage at 45° C., the cells were noted to have undergone an average height increase of 0.001 inch. All of the cells survived 12 weeks of storage at 45° C., and none of the cells suffered height increases of greater than 0.002 inches.

COMPARATIVE EXAMPLE B

After precipitation of the predominantly black divalent silver oxide powder mixture in the manner described in Comparative Example A above, a quantity of 20% dextrose was introduced into the reaction vessel. While maintaining the solution temperature at 90° C., the dextrose was allowed to react for a period of 15 minutes.

Filtering, washing and drying were carried out as in Comparative Example A.

The resultant dried silver oxide powder mixture, by chemical analysis, was found to contain 75% divalent silver oxide and 25% monovalent silver oxide.

It was noted that dry silver oxide powder mixture as produced in this comparative example, having been reacted with dextrose, could not be compressed into a cathode pellet of uniform density without a lubricating additive.

The rate of oxygen evolution from one gram of powder immersed in a 30% potassium hydroxide solution containing also 2% zinc oxide, and kept at a temperature of 45° C., was 150 micro liters per gram per day.

A number of MS76 size button cells were produced, each having a 0.75 gram cathode pellet, and it was noted that the cells underwent an average height increase of 0.01 inch during two weeks storage at 45° C. One of ten cells ruptured after two weeks storage at 45° C.

EXAMPLE 2

Following the procedure of Comparative Example A above, after the precipitation of the predominantly black divalent silver oxide powder mixture, a quantity of about 10% oleic acid was introduced into the reaction vessel. While maintaining the solution temperature at about 90° C., the oleic acid was allowed to react for 15 minutes.

Filtering, washing and drying were carried out as in Comparative Example A.

By chemical analysis, the resultant dried silver oxide powder mixture was found to contain 60% divalent silver oxide and 40% monovalent silver oxide. The dry silver oxide powder mixture, which had had oleic acid reacted therewith, was found to be easily compressed into a cathode pellet of uniform density without any lubricating additive.

The rate of oxygen evolution from one gram of the silver oxide powder mixture immersed in a 30% potassium hydroxide solution also containing 2% zinc oxide, and kept at a temperature of 45° C., was 20 micro liters per gram per day.

A number of MS76 size button cells were produced, each having a 0.75 gram cathode pellet, and it was noted that the cells underwent an average height increase of 0.001 inches during two weeks of storage at 45° C.

All of the cells survived 12 weeks of storage at 45° C., and none suffered a height increase of greater than 0.002 inches.

COMPARATIVE EXAMPLE C

The process of Comparative Example A, using the same starting compounds, was carried out at room temperature. Following the addition of the silver nitrate solution, the product was stirred and maintained at room temperature for a minimum of two hours. After washing and drying the resulting precipitate, it was noted that the rate of oxygen evolution from one gram of the resultant silver oxide powder mixture immersed in a 30% potassium hydroxide solution containing also 2% zinc oxide, and kept at a temperature of 45° C., was about 150 micro liters per gram per day.

A number of MS76 size button cells were produced, each having a 0.75 gram cathode pellet, and it was noted that the cells underwent an average height increase of 0.01 inch during two weeks storage at 45° C. Two of ten cells ruptured after two weeks storage at 45° C.

EXAMPLE 3

Following the procedure of Comparative Example C above, after precipitation of the predominantly black divalent silver oxide powder mixture, a quantity of about 10% oleic acid was introduced into the reaction vessel, and the temperature of the solution was raised to about 50° C. for 30 minutes.

Filtering, washing and drying were carried out as in Comparative Example A.

By chemical analysis, the resultant dried silver oxide powder mixture was found to contain 66% divalent silver oxide and 34% monovalent silver oxide. The dry silver oxide powder mixture, which had had oleic acid reacted therewith was found to be easily compressed into a cathode pellet of uniform density without any lubricating additive.

The rate of oxygen evolution from one gram of the silver oxide powder mixture immersed in a 30% potassium hydroxide solution also containing 2% zinc oxide, and kept at a temperature of 45° C., was 25 micro liters per gram per day.

A number of MS76 size button cells were produced, each having a 0.75 gram cathode pellet, and it was noted that the cells underwent an average height increase of 0.001 inches during two weeks of storage at 45° C.

All of the cells survived 12 weeks of storage at 45° C., and none suffered a height increase of greater than 0.002 inches.

COMPARATIVE EXAMPLE D AND EXAMPLE 4

Following the procedures of Comparative Example C and Example 3 and having reference to Comparative Example A, rather than dissolving 51 grams of silver nitrate in a minimum amount of water, 100 grams of commercially available silver monoxide powder was reacted in an alkaline solution containing potassium persulphate, and the product was stirred and maintained at room temperature for a minimum of seven hours. Similar results were noted, both with respect to silver oxide powder mixtures that had and had not been reacted with oleic acid, as those stated above with respect to Comparative Examples C and Example 3.

The examples given above have been for purposes of illustration, and the single FIGURE of drawings is intended also to be illustrative and not restrictive with respect to any button cell which might be produced according to this invention, all of which may occur without departing from the spirit and scope of the appended claims.

We claim:

1. The process of producing a silver oxide powder mixture for use in the cathode of an alkaline silver oxide galvanic cell, including the steps of partially reducing a mixture having at least 10% divalent silver oxide powder, the remainder including at least a minor amount of monovalent silver oxide powder, by reacting said silver oxide powder mixture with a reagent which is a fatty acid or a fatty acid salt where the fatty acid has a chain length of at least twelve carbon atoms, and removing the reagent from the reacted silver oxide powder mixture.

2. The process of claim 1, where said silver oxide powder mixture is reacted with from 1% to 20% by weight of the reagent.

3. The process of claim 1, where said silver oxide powder is reacted with from 5% to 10% by weight of the reagent.

4. The process of claim 1, where said reagent is removed from the reacted silver oxide powder mixture by washing the reacted mixture with water.

5. The process of claim 4, including the additional step of pressing a predetermined amount of the washed, reacted silver oxide powder mixture, to form a cathode pellet for an alkaline silver oxide galvanic cell.

6. The process of claim 1, where the amount of reduction of divalent silver oxide constituent of said reacted silver oxide powder mixture, to monovalent silver oxide, is at least 1% by weight of said divalent silver oxide constituent.

7. A silver oxide powder mixture for use in the cathode of an alkaline silver oxide galvanic cell, produced by the process of claim 1.

8. A cathode pellet formed by the process of claim 5, said cathode pellet, when immersed in an alkaline cell electrolyte, displaying a low rate of oxygen evolution.

9. The silver oxide powder mixture of claim 7, where the divalent silver oxide constituent is present in an amount of from 10% to 99% by weight, and the monovalent silver oxide constituent is present in an amount of from 1% to 90% by weight.

10. The silver oxide powder mixture of claim 7, wherein the reactant comprises at least one material selected from the group comprising oleic, stearic, palmitic, linoleic, lauric, and myristic acids, and the alkali metal salts thereof, said reactant being present in an amount of less than 0.05% by weight.

11. An alkaline silver oxide galvanic cell comprising an anode, a cathode, and at least one electrolyte carrying separator disposed between said anode and said cathode, the combination being retained in a conductive retainer having a negative terminal electrically associated with said anode and a positive terminal electrically associated with said cathode, both terminals being electrically insulated from one another; where said cathode comprises a pellet formed from the silver oxide powder mixture of claim 7.

12. The alkaline silver oxide galvanic cell of claim 11, where the divalent silver oxide constituent of said cathode pellet is present in an amount of from 10% to 99% by weight, and the monovalent silver oxide constituent is present in an amount of from 1% to 90% by weight.

13. In a method for producing a cell having a silver oxide cathode the improvement for reducing internal gassing comprising the steps of reacting particulate silver oxide with a fatty acid or a salt of a fatty acid, thereafter removing the excess fatty acid or the salt of a fatty acid from the silver oxide, and then forming the cathode.

* * * * *